United States Patent [19]

Hobbs

[11] 4,265,263

[45] May 5, 1981

[54] NON-LINEAR LEVEL CONTROLLER

[75] Inventor: James W. Hobbs, Sweeny, Tex.

[73] Assignee: Phillips Petroleum Company, Bartlesville, Okla.

[21] Appl. No.: 70,300

[22] Filed: Aug. 28, 1979

[51] Int. Cl.³ ............................................. F17D 3/01
[52] U.S. Cl. ........................................ 137/2; 137/389; 137/395; 196/132; 202/160; 203/1; 203/DIG. 18; 364/118; 364/500
[58] Field of Search ............... 55/18, 48, 227; 137/86, 137/386, 389, 2, 395; 196/132; 202/160, 181; 203/1, DIG. 18; 364/118, 500

[56] References Cited

U.S. PATENT DOCUMENTS

| | | | |
|---|---|---|---|
| 2,476,104 | 7/1949 | Mason | 137/14 |
| 2,842,311 | 7/1958 | Detrie | 364/118 |
| 3,224,947 | 12/1965 | Lupfer | 196/132 |
| 3,411,308 | 11/1968 | Bellinger | 202/160 |
| 3,449,215 | 6/1969 | Johnson et al. | 202/160 |
| 3,594,559 | 7/1971 | Pemberton | 364/500 |
| 3,602,701 | 8/1971 | Boyd, Jr. | 364/500 |
| 3,676,304 | 7/1972 | Hobbs | 203/1 |
| 3,967,937 | 7/1976 | Hobbs | 55/227 |
| 3,974,364 | 8/1976 | Sallberg et al. | 364/118 |

Primary Examiner—Martin P. Schwadron
Assistant Examiner—G. L. Walton

[57] ABSTRACT

A non-linear level controller is provided in which the proportional term is a function of the actual liquid level in a vessel compared to the actual liquid level in the vessel at a previous time. The integral term is a function of the actual liquid level in the vessel compared to a set point which is representative of the desired liquid level in the vessel. Both the proportional term and the integral term are modified by a variable gain factor which is a non-linear function of the liquid level being controlled. The proportional term and integral term are combined to provide the controller output which is utilized to manipulate a flow of liquid from the vessel in which the liquid level is being controlled.

14 Claims, 2 Drawing Figures

NON-LINEAR LEVEL CONTROLLER

This invention relates to method and apparatus for controlling a liquid level. In one aspect this invention relates to an improved non-linear level controller which can be easily tuned. In another aspect this invention relates to an improved non-linear level controller which prevents over-control at high and low limits but still has the capability to return a liquid level to the set point for the liquid level. In another aspect this invention relates to an improved non-linear level controller which prevents wind-up above or below any limits on the manipulated variable. In still another aspect this invention relates to an improved non-linear level controller in which a change in the set point for the liquid level being controlled does not cause a bump in the manipulated variable.

A non-linear level controller is a feedback controller with a variable gain factor which is a non-linear function of the level being controlled. The function causes a reduction of gain when the level being controlled is close to the set point for the liquid level. Non-linear level controllers are typically utilized to reduce the variation in the flow from the vessel in which a liquid level is being controlled. Typical applications for non-linear level controllers are situations where a liquid level is being controlled by means of a flow which can cause undesired disturbances for another process. These situations typically occur in chemical processes in which the flow from one vessel, such as a accumulator or fractionator, is utilized as a feed for a second process.

In the past, the variable gain factor has made the non-linear level controller very difficult to tune. This is primarily because the gain term may vary during the tuning process if the level being controlled is varying. The response of the non-linear level controller will thus be changing and it is very difficult to tune any controller where the output of the controller is not the same each time a standard step change is applied. The fact that the non-linear level controller may be tuned when the variable gain factor is low does not necessarily mean that the non-linear level controller is tuned when the variable gain factor is high. It is thus an object of this invention to provide an improved non-linear level controller which can be easily tuned.

The primary function of a non-linear level controller is to reduce variations in the flow which is being manipulated to maintain a desired liquid level. If changes are to occur in the manipulated flow, these changes should be smooth and slow so as to prevent process disturbances where the flow is being used as a feed for another process. Typically, if the liquid level is either much greater than or much less than the set point for the liquid level, then the output of a typical non-linear level controller is large and any change in the liquid level will cause a large change in the controller output thus causing an abrupt change in the manipulated flow. It is much more desirable to correct for large differences between the actual liquid level and the desired liquid level by changing the manipulated flow rate slowly and smoothly. It is thus another object of this invention to provide an improved non-linear level controller which prevents over-control at high and low limits but still has the capability to return a liquid level to the set point for the liquid level.

Still another problem which is typical for a non-linear level controller is wind-up of the controller output above or below any limits on the manipulated variable. This happens when the liquid level is not at the controller set point and the output of the non-linear controller cannot cause a change in the manipulated variable. This could result for example when the control valve on the variable is completely open. Due to the integral action of the non-linear level controller the output from the controller will keep trying to increase the flow rate. Thus, the set point for the flow controller is increased to a very high, non-obtainable value. Then when the liquid level does come down within a controllable range, the non-linear level controller must lower the set point of the flow controller from the very high value. The rate at which the set point is lowered is determined by the proportional gain and the integral gain terms of the non-linear level controller. There is a delay before the non-linear level controller has the set point of the flow controller back to a controller range. The delay can cause the liquid level to "over shoot" its desired value. It is thus another object of this invention to provide an improved non-linear level controller which prevents wind-up of the output of the controller above or below any limits on the manipulated variable.

The proportional term of a typical non-linear level controller output is generally a function of the difference between the actual liquid level and the desired level for the liquid. Thus, if the set point for the liquid level is changed, this will generally cause a bump in the output of the controller which will produce a similar variation in the manipulated flow. Since the whole purpose of a non-linear controller is to prevent variations in the manipulated flow, it is another object of this invention to provide an improved non-linear level controller in which a change in the set point does not cause a bump in the manipulated variable.

In accordance with the present invention, a non-linear level controller is provided in which a variable gain factor which is a non-linear function of the level being controlled is utilized to vary the gain of the non-linear level controller in response to the difference between the actual liquid level and the desired liquid level which is represented by a set point. The proportional term of the output from the non-linear level controller is a function of the difference between the actual liquid level and the actual liquid level at a previous time. This difference is multiplied by the variable gain factor and the resulting product is multiplied by a gain term to provide the incremental proportional output. The integral output for the non-linear level controller is a function of the difference between the actual liquid level and the set point for the liquid level. This difference is limited by a magnitude limit and is then multiplied by the variable gain factor. The resulting product is then multiplied by a gain term to provide the incremental integral output. The incremental integral output and the incremental proportional output are combined to provide the total incremental output of the non-linear level controller. The total incremental output of the non-linear level controller is integrated to provide the position output of the non-linear level controller which is utilized to manipulate the flow which is being controlled so as to maintain a desired liquid level.

Other objects and advantages of the invention will be apparent from the foregoing brief description of the invention and from the claims as well as from the detailed description of the drawing in which:

The invention is described in terms of the control of the liquid level in an overhead accumulator. However, the invention is applicable to the control of the liquid level in any container or vessel or any means for storing a liquid.

The non-linear level controller of the present invention is also described in terms of implementation on a digital computer. However, the non-linear level controller could be implemented by means of analog logic if desired.

Figure 1:
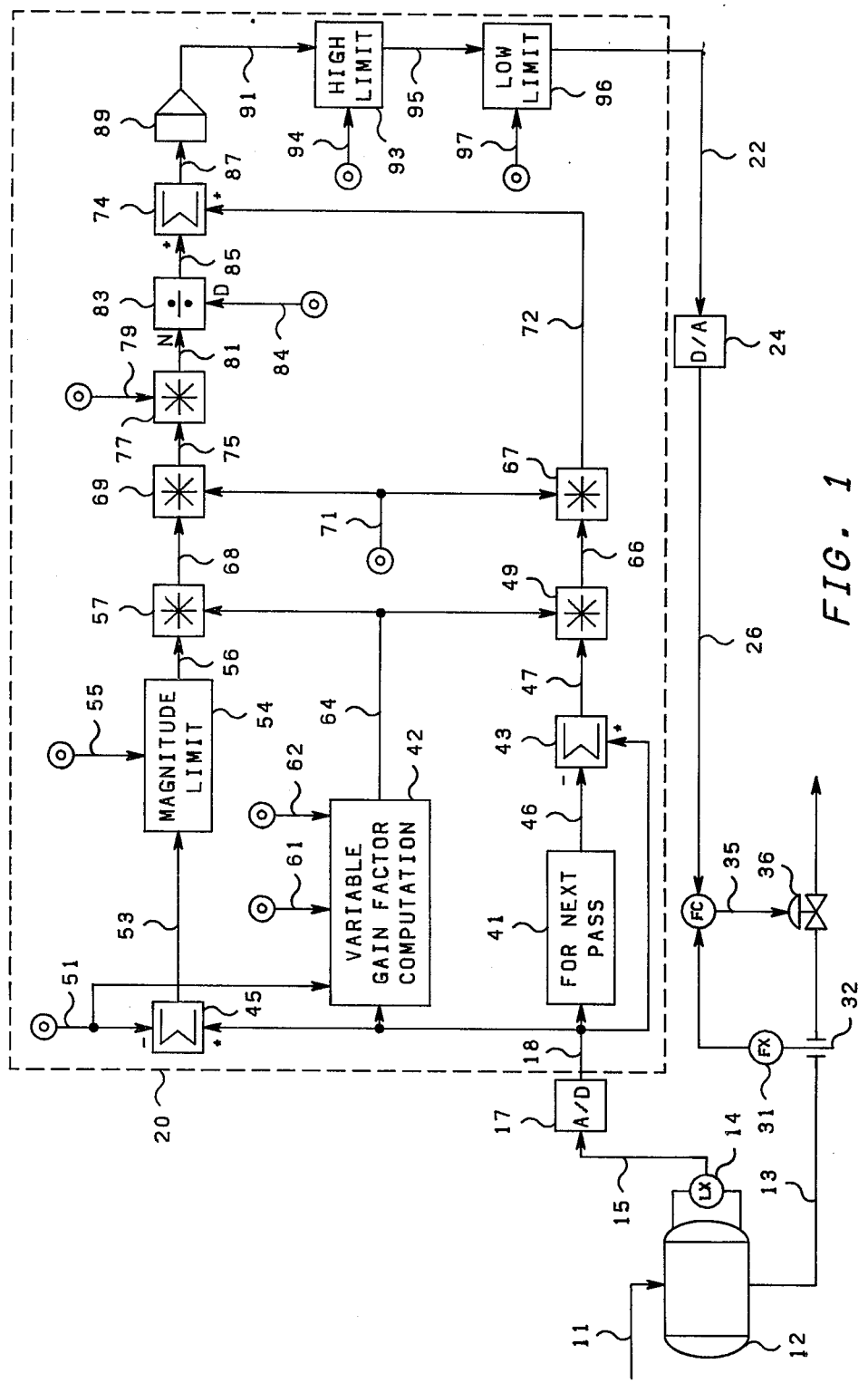
FIG. 1 is a diagrammatic view of the non-linear level controller of the present invention.

Referring now to the drawings, and in particular to FIG. 1, a fluid is provided through conduit means 11 to the accumulator 12 which may be an overhead accumulator associated with a fractionator. Fluid from the overhead accumulator 12 is provided to another process through conduit means 13. The liquid level in the accumulator 12 is measured by the level transducer 14 which provides signal 15, representative of the liquid level in the accumulator 12, to the analog-to-digital (A/D) converter 17. It is noted that signal 15 will be in percent indicating that the accumulator 12 is 50% full, 40% full, etc. Signal 15 is converted from analog form to digital form by the A/D converter 17 and is provided as signal 18 to computer means 20 which is preferably an Optrol 3600 manufactured by Applied Automation, Inc., Bartlesville, Oklahoma. Signal 18, which is a digital representation of the actual liquid level in the accumulator 12, is processed by a digital implementation of a non-linear level controller to provide signal 22 which is representative of the flow rate of fluid through conduit means 13 required to maintain a desired liquid level in accumulator 12. Signal 22 is utilized to manipulate the flow of fluid through conduit means 13 in such a manner that variations in the flow of fluid through conduit means 13 are substantially reduced. Signal 22 is provided as an input to the digital-to-analog (D/A) converter 24. Signal 22 is converted from digital form to analog form by the D/A converter 24 and is provided as signal 26 to the flow controller 28. Signal 26 may be considered as the set point for the flow controller 28.

Flow transducer 31 in combination with flow sensor 32 which is operably located in conduit means 13 provides an output signal 33 which is representative of the actual flow rate of fluid through conduit means 13. Signal 33 is provided as the variable input to the flow controller 28. In response to signals 26 and 33, the flow controller 28 provides an output signal 35 which is responsive to the difference between signals 33 and 26. Signal 35 is provided from the flow controller 28 to the pneumatic control valve 36 which is operably located in conduit means 13. The pneumatic control valve 36 is manipulated in response to signal 35 to thereby maintain the actual flow rate of fluid through conduit means 13 substantially equal to the desired flow rate represented by signal 26.

As has been previously stated, the non-linear level controller of the present invention is preferably implemented by digital logic. The output of the digitally implemented non-linear level controller is periodically changed and the time between these changes is referred to as the execution interval. In some cases, data is stored during one execution interval and utilized in the next execution interval. Each update of the output of the non-linear level controller will be referred to as a "pass" through the non-linear level controller.

Signal 18, which is a digital representation of the actual liquid level in the accumulator 12, is provided as an input to the for next pass block 41, and as an input to the variable gain factor computation block 42. Signal 18 is also provided to the minuend input of the summing block 43 and the summing block 45. The actual liquid level in the accumulator 12 is delayed for one pass in for next pass block 41. Thus, the output signal 46 from the for next pass block 41 is equal to the previous pass level measurement. Signal 46 is provided from the for next pass block 41 to the subtrahend input of the summing block 43. Signal 46 is subtracted from signal 18 to provide signal 47 which is representative of the change in the liquid level in the accumulator 12 since the previous pass. Signal 47 is provided from the summing block 43 as an input to the multiplying block 49.

Signal 51, which is representative of the desired liquid level, expressed as a percentage, in the accumulator 12, is provided to the subtrahend input of the summing block 45 and is also provided as an input to the variable gain factor computation block 42. Signal 51 is subtracted from signal 18 to provide signal 53 which is representative of the difference between the actual liquid level and the desired liquid level. Signal 53 is provided from the summing block 45 as an input to the magnitude limit block 54. The magnitude limit block 54 is also provided with a signal 55 which is representative of the magnitude limit on the integral error signal 53. Signal 56 from the magnitude limit block 54 will thus be equal to the magnitude of signal 53 unless the magnitude of signal 53 exceeds the magnitude of signal 55. If the magnitude of signal 53 exceeds the magnitude of signal 55 the magnitude of signal 56 will be equal to the magnitude of signal 55. Signal 56 is provided from the magnitude limit block 54 as an input to the multiplying block 57. Signal 61, which is representative of the high liquid level limit for the accumulator 12 is provided as an input to the variable gain factor computation block 42. In like manner signal 62 which is representative of the low liquid level limit for the accumulator 12 is provided as an input to the variable gain factor computation block 42. In response to signals 18, 51, 61 and 62, the variable gain factor computation block 42 provides an output signal 64 which is representative of the variable gain factor. The variable gain factor which is represented by signal 64 is a non-linear function of the level in accumulator 12. The manner in which the variable gain factor 64 is generated will be described more fully hereinafter. Signal 64 is provided from the variable gain factor computation block 42 as an input to both multiplying block 49 and multiplying block 57.

Signal 47 is multiplied by signal 64 to provide signal 66 which is representative of the change in liquid level since the previous pass modified by the variable gain factor. Signal 66 is provided from the multiplying block 49 as an input to the multiplying block 67. Signal 56 is multiplied by signal 64 to provide signal 68 which is representative of the integral error term modified by the variable gain factor. Signal 68 is provided from the multiplying block 57 to the multiplying block 69. Signal 71, which is representative of the proportional gain for the non-linear level controller, is provided as an input to both the multiplying block 67 and the multiplying block 69. Signal 66 is multiplied by signal 71 to provide signal 72 which is representative of the incremental proportional output for the non-linear level controller. Signal 72 is provided from the multiplying block 67 to the summing block 74.

Signal 68 is multiplied by signal 71 to provide signal 75 which is representative of the integral error modified by both the variable gain factor and the porportional constant. Signal 75 is provided from the multiplying block 69 to the multiplying block 77. Signal 79 which is representative of the execution interval (minutes per pass) is provided as a second input to the multiplying block 77. Signal 75 is multiplied by signal 79 to provide signal 81. Signal 81 is provided from the multiplying block 77 to the numerator input of the dividing block 83. Signal 84, which is representative of the integral setting or integral gain term for the non-linear controller, is provided as the denominator input of the dividing block 83. Signal 81 is divided by signal 84 to provide signal 85 which is representative of the incremental integral output for the non-linear level controller.

Signal 72 is summed with signal 85 to provide signal 87 which is representative of the total incremental output for the non-linear level controller. Signal 87 is provided from the summing block 74 as an input to the integrator 89. In effect, signal 87 is simply added to the previous output from the non-linear level controller to provide signal 91 which is representative of the position output of the non-linear level controller. Signal 91 is provided from the integrator 89 as an input to the high limit block 93. The high limit block 93 is also provided with a signal 94 which is representative of the output of the non-linear level controller which will cause the pneumatic control valve 36 to be fully open. Signal 95 from the high limit block 93 will thus be equal to signal 91 unless signal 91 is greater than signal 94. If signal 91 is greater than signal 94, signal 95 will be equal to signal 94. Signal 95 is provided from the high limit block 93 as an input to the low limit block 96. The low limit block 96 is also provided with a signal 97 which is representative of the output of the non-linear level controller which will cause the pneumatic control valve 36 to be fully closed. The output signal 22 from the low limit block 96 will thus be equal to signal 95 unless signal 95 is less than the value of signal 97. If signal 95 is less than the value of signal 97, signal 22 will be equal to signal 97.

A simplified listing of computer statements which could be utilized to implement the non-linear level controller of the present invention will be utilized to more fully illustrate and describe the non-linear level controller. Symbols utilized in the computer statements and their equivalents to signals illustrated in FIG. 1 are as follows:

VGF=variable gain factor=signal 64
L=level measurement signal=signal 18
SP=level set point=signal 51
LL=accumulator level low limit=signal 62
LH=accumulator level high limit=signal 61
E=integral error=signal 53
EMAX=integral error magnitude limit=signal 55
LP=previous pass level measurement=signal 46
DL=change in level since previous pass=signal 47
KP=proportional gain=signal 71
TI=integral setting or integral gain term=signal 84
SI=execution interval=signal 79
DP=incremental proportional output=signal 72
DI=incremental integral output=signal 85
DF=total incremental output of non-linear level controller=signal 87
FS=position output of non-linear level controller=signal 91
HHL=high limit on non-linear level controller output=signal 94
LLL=low limit on non-linear level controller output=signal 97

A simplified listing of computer statements which can be utilized to implement the non-linear level controller of the present invention and the corresponding blocks, illustrated in FIG. 1, which are utilized to carry out the computer statements is as follows:

| | |
|---|---|
| VGF = 1.<br>IF(L.GT.LL) VGF = (SP-L)/(SP-LL)<br>IF(L.GT.SP) VGF = (L-SP)/(HL-SP)<br>IF(L.GT.HL) VGF = 1. | variable gain factor computation block 42 |
| E = L-SP | summing block 45 |
| IF(E.GT.E MAX) E = E MAX<br>IF(E.LT.(−E MAX)) E = E MAX | magnitude limit block 54 |
| DL = L-LP | summing block 43 |
| LP = L | for next pass block 41 |
| DP = DL* VGF* KP | multiplying blocks 49 and 67 |
| DI = E* VGF* SI/TI | multiplying blocks 69 and 77 and dividing block 83 |
| DF = DP + DI | summing block 74 |
| FS = FS + DF | integrator 89 |
| IF(FS.GT.HHL) FS = HHL | high limit 93 |
| IF(FS.LT.LLL) FS = LLL | low limit 96 |

Figure 2:
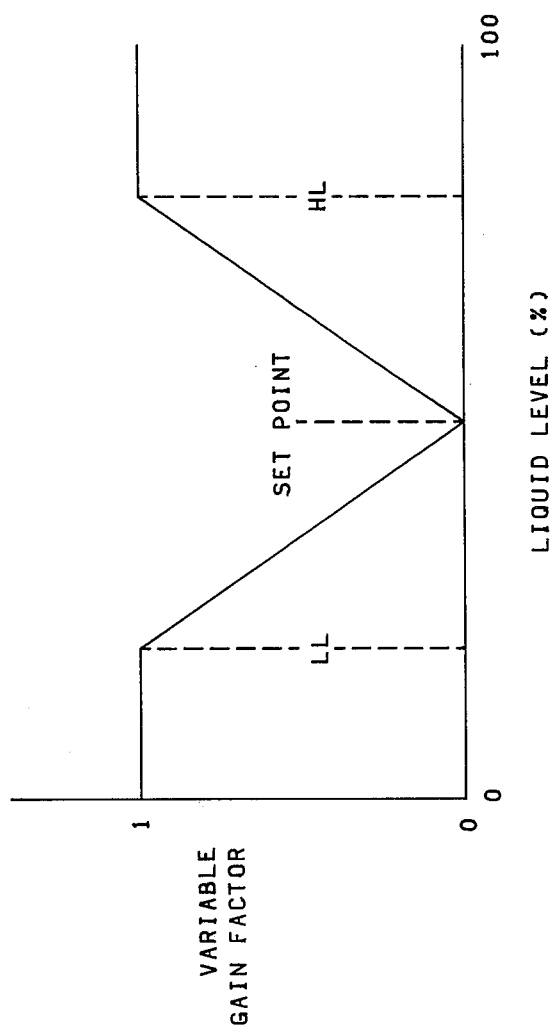
FIG. 2 is a graphical illustration of the variable gain factor of FIG. 1.

The variable gain factor utilized is more fully illustrated in FIG. 2. The curve is generated simply by setting the set point and the high and low limits. The liquid level in the accumulator 12 is then determinative of the value of the variable gain factor. As is illustrated in FIG. 2, the variable gain factor may range from 0 to 1.

Any desired values for the gain terms and the other constant terms required by the non-linear level controller such as the high and low limits may have any desired values. In general, the proportional gain (KP) will have a range from about 5 to about 20. Preferably, the proportional gain is set at 10. The integral setting (TI) will have a range from about 2 to about 60 minutes. Preferably the integral setting is set at 30. The execution interval (SI) may have a range from about 0.01 to about 0.5 minutes. The execution interval will preferably be 0.5 minutes. The integral error magnitude limit (E MAX) may have a value of about 2 to about 10 percent with 5 percent being preferred. The high limit for the liquid level in the accumulator 12 will have a value of about 0 to about 30 percent above the level set point and is preferably set at 10 percent above the level set point. The low limit (LL) for the liquid level in the accumulator 12 may have a value of about 0 to about 30 percent below the level set point with 10 percent below the level set point being preferred.

The non-linear level controller illustrated in FIG. 1 may be tuned simply by setting the high limit (HH) equal to the low limit (LL). The variable gain factor will thus be forced to a value of 1 and the non-linear level controller can be tuned like a simple proportional-integral controller using the well known Ziegler Nichols method.

The magnitude limit on the integral error prevents the tendency of a non-linear level controller to overcontrol at high and low levels. The magnitude limit of the integral error also enables the non-linear level controller to return the liquid level in the accumulator 12 to the set point value.

Wind-up of the output of the non-linear level controller above or below any limits on the manipulated variable is effectively prevented by the high limit 93 and the low limit 96. Since signal 94 is preferably set at a signal which will fully open the pneumatic control valve 36 and the low limit is set for a signal which will fully close the pneumatic control valve 36, wind-up of the output from the controller is effectively prevented.

The proportional term of the output from the non-linear level controller is a function of the difference between the actual liquid level in the accumulator 12 and the actual liquid level in the accumulator 12 for a previous pass. The proportional output from the non-linear level controller is not a function of the difference between the actual liquid level in the accumulator 12 and the set point for the liquid level in the accumulator 12 and thus a change in the set point will not cause a bump to occur in the flow rate of the fluid flowing through conduit means 13.

The invention has been described in terms of a preferred embodiment as illlustrated in FIGS. 1 and 2. Specific components which can be used in the practice of the invention as illustrated in FIG. 1 such as flow sensor 32, flow transducer 31, level transducer 14, flow controller 28 and pneumatic control valve 36 are each well known, commercially available control components such as are illustrated and described at length in Perry's Chemical Engineer's Handbook, 4th Edition, Chapter 22, McGraw-Hill. A suitable A/D converter 17 is the MM5357 8-bit A/D converter manufactured by National Semiconductor Corp., Sana Clara, Calif. A suitable D/A converter 24 is the AD550 8-bit D/A converter manufactured by Analog Devices, Norwood, Mass.

Although the invention has been described in terms of the presently preferred embodiment, reasonable variations and modifications are possible by those skilled in the art, within the scope of the described invention and the appended claims.

That which is claimed is:

1. A non-linear level controller for controlling the level of a liquid in a means for containing said liquid comprising:
   means for establishing a first signal (LP) representative of the actual level of said liquid at a time $T_1$;
   means for establishing a second signal (L) representative of the actual liquid level of said liquid at a time $T_2$, said time $T_2$ being later in time than said time $T_1$;
   means for subtracting said first signal from said second signal to establish a third signal representative of the change in liquid level (DL) between said time $T_1$ and said time $T_2$;
   means for establishing a variable gain factor (VGF) which is a non-linear function of the level of said liquid;
   means for multiplying said third signal by said variable gain factor to establish a fourth signal representative of (VGF)*(DL);
   means for establishing an incremental proportional output (DP) in response to said fourth signal;
   means for establishing a fifth signal (SP) representative of the desired level of said liquid;
   means for subtracting said fifth signal from said second signal to establish a sixth signal representative of the integral error (E);
   means for multiplying said sixth signal by said variable gain factor to establish a seventh signal representative of (VGF)*(E);
   means for establishing an incremental integral output (DI) in response to said seventh signal;
   means for combining said incremental proportional output and said incremental integral output to produce a total incremental output (DF);
   means for adding said total incremental output to the total incremental output of said non-linear level controller at said time $T_1$ to establish a position output (FS); and
   means for manipulating the flow of liquid from said means for containing said liquid in response to said position output to thereby control the level of said liquid in said means for containing said liquid.

2. Apparatus in accordance with claim 1 wherein said means for establishing said variable gain factor comprises:
   means for establishing an eighth signal representative of the high limit (HL) for the level of said liquid in said means for containing said liquid;
   means for establishing a ninth signal representative of the low limit (LL) for the level of said liquid in said means for containing said liquid;
   means for setting said variable gain factor equal to 1.0 if the level of said liquid is less than the magnitude of said ninth signal;
   means for setting said variable gain factor equal to (SP-L)(SP-LL) if said level is greater than the magnitude of said ninth signal;
   means for setting said variable gain factor equal to (L-SP)(HL-SP) if the level of said liquid is greater than the magnitude of said fifth signal; and
   means for setting said variable gain factor equal to 1.0 if the level of said liquid is greater than the magnitude of said eighth signal.

3. Apparatus in accordance with claim 2 wherein said means for establishing said incremental proportional output comprises:
   means for establishing a tenth signal representative of a proportional gain term (KP); and
   means for multiplying said fourth signal by said tenth signal to establish said incremental proportional output.

4. Apparatus in accordance with claim 3 wherein said means for establishing said incremental integral output comprises:
   means for establishing an eleventh signal representative of the difference between said time $T_2$ and said time $T_1$;
   means for establishing a twelfth signal representative of an integral gain term (TI);
   means for multiplying said seventh signal by said tenth signal to establish a thirteenth signal representative of (VGF)*(E)*(KP);
   means for multiplying said thirteenth signal by said eleventh signal to establish a fourteenth signal representative of (VGF)*(E)*(KP)*(SI); and
   means for dividing said fourteenth signal by said twelfth signal to establish said incremental integral output.

5. Apparatus in accordance with claim 1 additionally comprising:
   means for establishing an eighth signal representative of a magnitude limit (E MAX) for said sixth signal;

means for setting said sixth signal equal to said magnitude limit if said sixth signal exceeds said magnitude limit; and means for setting said sixth signal equal to the negative of said magnitude limit if said sixth signal is less than the negative of said magnitude limit, said magnitude limit preventing said non-linear level controller from over-controlling when said variable gain factor is approaching its maximum value.

6. Apparatus in accordance with claim 1 additionally comprising:

means for establishing an eighth signal representative of a high limit (HHL) for said position output;

means for establishing a ninth signal representative of a low limit (LLL) for said position output;

means for setting said position output equal to said eighth signal if said position output is greater than said eighth signal; and means for setting said position output equal to said low limit if said position output is less than said low limit.

7. A method for controlling the level of a liquid in a means for containing said liquid comprising the steps of:

establishing a first signal (LP) representative of the actual level of said liquid at a time $T_1$;

establishing a second signal (L) representative of the actual liquid level of said liquid at a time $T_2$, said time $T_2$ being later in time than said time $T_1$;

subtracting said first signal from said second signal to establish a third signal representative of the change in liquid level (DL) between said time $T_1$ and said time $T_2$;

establishing a variable gain factor (VGF) which is a non-linear function of the level of said liquid;

multiplying said third signal by said variable gain factor to establish a fourth signal representative of (VGF)*(DL);

establishing an incremental proportional output (DP) in response to said fourth signal;

establishing a fifth signal (SP) representative of the desired level of said liquid;

subtracting said fifth signal from said second signal to establish a sixth signal representative of the integral error (E);

multiplying said sixth signal by said variable gain factor to establish a seventh signal representative of (VGF)*(E);

establishing an incremental integral output (DI) in response to said seventh signal;

combining said incremental porportional output and said incremental integral output to produce a total incremental output (DF);

adding said total incremental output to the total incremental output of said non-linear level controller at said time $T_1$ to establish a position output (FS); and manipulating the flow of liquid from said means for containing said liquid in response to said position output to thereby control the level of said liquid in said means for containing said liquid.

8. A method in accordance with claim 7 wherein said step of establishing said variable gain factor comprises:

establishing an eighth signal representative of the high limit (HL) for the level of said liquid in said means for containing said liquid;

establishing a ninth signal representative of the low limit (LL) for the level of said liquid in said means for containing said liquid;

setting said variable gain factor equal to 1.0 if the level of said liquid is less than the magnitude of said ninth signal;

setting said variable gain factor equal to (SP-L)/(SP-LL) if said level is greater than the magnitude of said ninth signal;

setting said variable gain factor equal to (L-SP)/(HL-SP) if the level of said liquid is greater than the magnitude of said fifth signal; and setting said variable gain factor equal to 1.0 if the level of said liquid is greater than the magnitude of said eighth signal.

9. A method in accordance with claim 8 wherein said step of establishing said incremental proportional output comprises:

establishing a tenth signal representative of a proportional gain term (KP); and multiplying said fourth signal by said tenth signal to establish said incremental proportional output.

10. A method in accordance with claim 9 wherein said step of establishing said incremental integral output comprises:

establishing an eleventh signal representative of the difference between said time $T_2$ and said time $T_1$;

establishing a twelfth signal representative of an integral gain term (TI);

multiplying said seventh signal by said tenth signal to establish a thirteenth signal representative of (VGF)*(E)*(KP);

multiplying said thirteenth signal by said eleventh signal to establish a fourteenth signal representative of (VGF)*(E)*(KP)*(SI); and dividing said fourteenth signal by said twelfth signal to establish said incremental integral output.

11. A method in accordance with claim 7 additionally comprising the steps of:

establishing an eighth signal representative of a magnitude limit (E MAX) for said sixth signal;

setting said sixth signal equal to said magnitude limit if said sixth signal exceeds said magnitude limit; and setting said sixth signal equal to the negative of said magnitude limit if said sixth signal is less than the negative of said magnitude limit, said magnitude limit preventing said non-linear level controller from over-controlling when said variable gain factor is approaching its maximum value.

12. A method in accordance with claim 7 additionally comprising the steps of:

establishing an eighth signal representative of a high limit (HHL) for said position output;

establishing a ninth signal representative of a low limit (LLL) for said position output;

setting said position output equal to said eighth signal if said position output is greater than said eighth signal; and setting said position output equal to said low limit if said position output is less than said low limit.

13. Apparatus for establishing a variable gain factor (VGF) for a non-linear level controller comprising:

means for establishing a first signal (L) representative of the actual level of a liquid in a means for containing said liquid;

means for establishing a second signal (SP) representative of the desired level of said liquid in said means for containing said liquid;

means for establishing a third signal representative of the high limit (HL) for the level of said liquid in said means for containing said liquid;

means for establishing a fourth signal representative of the low limit (LL) for the level of said liquid in said means for containing said liquid;

means for setting said variable gain factor equal to 1.0 if the level of said liquid is less than the magnitude of said fourth signal;

means for setting said variable gain factor equal to (SP-L)/(SP-LL) if said level is greater than the magnitude of said fourth signal;

means for setting said variable gain factor equal to (L-SP)/(HL-SP) if the level of said liquid is greater than the magnitude of said second signal; and means for setting said variable gain factor equal to 1.0 if the level of said liquid is greater than the magnitude of said third signal.

14. A method for establishing a variable gain factor (VGF) for a non-linear level controller comprising the steps of:

establishing a first signal (L) representative of the actual level of a liquid in a means for containing said liquid;

establishing a second signal (SP) representative of the desired level of said liquid in said means for containing said liquid;

establishing a third signal representative of the high limit (HL) for the level of said liquid in said means for containing said liquid;

establishing a fourth signal representative of the low limit (LL) for the level of said liquid in said means for containing said liquid;

setting said variable gain factor equal to 1.0 if the level of said liquid is less than the magnitude of said fourth signal;

setting said variable gain factor equal to (SP-L)/(SP-LL) if said level is greater than the magnitude of said fourth signal;

setting said variable gain factor equal to (L-SP)/(HL-SP) if the level of said liquid is greater than the magnitude of said second signal; and setting said variable gain factor equal to 1.0 if the level of said liquid is greater than the magnitude of said third signal.

* * * * *